United States Patent [19]
Kubo

[11] Patent Number: 4,601,773
[45] Date of Patent: Jul. 22, 1986

[54] APPARATUS FOR SUPPLYING BEAD PORTION IN TIRE-FORMING MACHINE

[75] Inventor: Masayoshi Kubo, Nagasaki, Japan

[73] Assignee: Mitsubishi Jukogyo Kabushiki Kaisha, Tokyo, Japan

[21] Appl. No.: 628,436

[22] Filed: Jul. 6, 1984

Related U.S. Application Data

[63] Continuation of Ser. No. 371,459, Apr. 23, 1982, abandoned.

[30] Foreign Application Priority Data

Apr. 27, 1981 [JP] Japan ................................. 56-63813

[51] Int. Cl.$^4$ ............................................. B29D 30/18
[52] U.S. Cl. .................................... 156/403; 156/126; 156/131; 156/406.2
[58] Field of Search ................. 156/403, 406.2, 394.1, 156/135, 131–132, 130.7, 128.1, 126, 123

[56] References Cited
U.S. PATENT DOCUMENTS

| | | | |
|---|---|---|---|
| 4,007,080 | 2/1977 | Klöpper | 156/126 |
| 4,190,482 | 2/1980 | Yabe | 156/403 |
| 4,430,143 | 2/1984 | Aihdra | 156/403 |

*Primary Examiner*—Lois E. Boland
*Attorney, Agent, or Firm*—Wyatt, Gerber, Shoup, Scobey and Badie

[57] ABSTRACT

There is provided an apparatus for supplying a bead portion in a tire-forming machine. The apparatus consists in carrying out the steps of assembling an inner liner, carcass ply and others in the cylindrical form of a band, transferring the band by band transfer means onto a carcass-forming drum arranged on the same shaft as said transfer means, incorporating the bead portion and a tread portion by stitching, which apparatus comprises a bead-temporary applying device for supplying beads at a headstock, said device being provided at the side of said carcass-forming drum toward said band transfer means.

1 Claim, 6 Drawing Figures

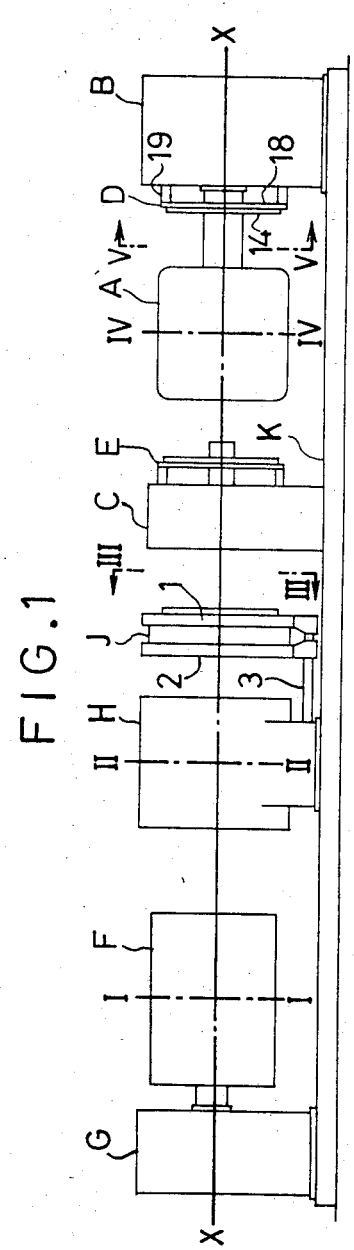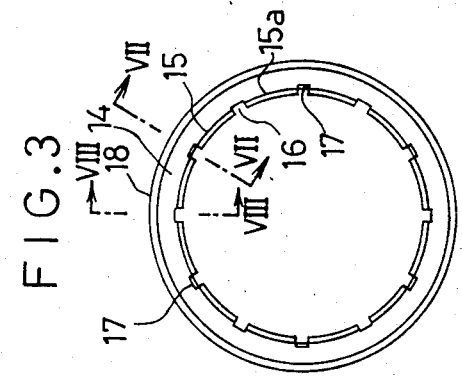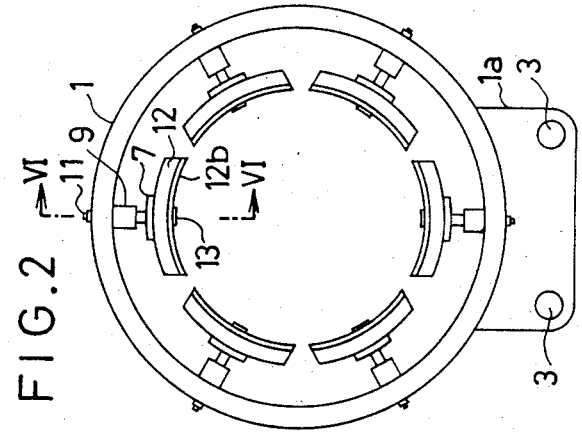

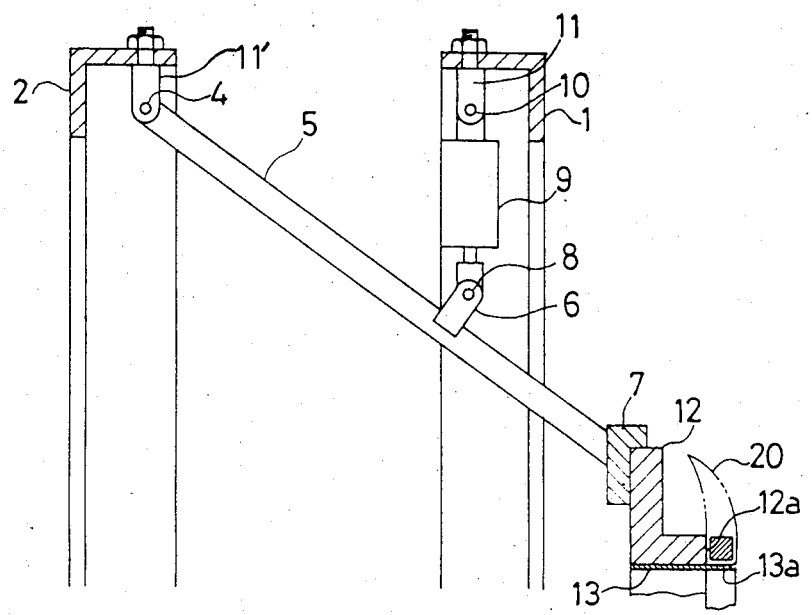
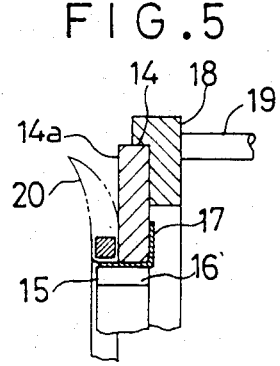
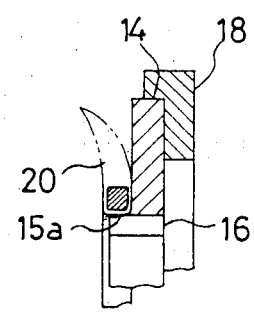

APPARATUS FOR SUPPLYING BEAD PORTION IN TIRE-FORMING MACHINE

This application is a continuation of U.S. patent application Ser. No. 06/371,459 filed 4-23-82, now abandoned.

The present invention relates to a tire-forming machine, particularly an apparatus for supplying beads in a tire-forming machine which comprises assembling an inner liner, carcass ply and others in cylindrical form to produce a band on a band-forming drum, transferring said band by band transfer means onto a carcass-forming drum arranged on the same shaft as said band transfer means, incorporating beads therein and stitching a tread portion.

Since the internal diameter of a bead portion as one of the structural members of a tire is made smaller than the external diameter of a carcass-forming drum at the time of tire formation, it is impossible to supply beads at a headstock-side to a bead-setting ring except when the carcass forming drum is in folded condition and moreover except during a time before the insertion of a band.

These inconvenient conditions lead to the restriction of working by the tire-forming operator and, to make the matter worse, since the time of applying beads at the headstock to the bead-setting ring is part of a tire-forming cycle time, this cycle time involves such prolongation of time as an unavoidable drawback at present.

Certainly in view of all the aforegoing drawbacks, the present invention has been proposed. Namely, in the case of a tire-forming machine wherein an inner liner, carcass ply and others are stitched together in cylindrical form on a band-forming drum so as to produce a band, said band thus produced is transferred by band transfer means onto a carcass-forming drum arranged on the same shaft as said band transfer means, beads are incorporated therein and a tread portion is stitched thereto, the present invention characteristically comprises providing a bead-temporary installing device for beads at the side of a headstock toward the side of the carcass-forming drum of said band transfer means.

Thus the object of the present invention is to provide a bead-supplying apparatus for a tire-forming machine which is capable of eliminating the usual restrictions of working by the tire-forming operator and simultaneously permitting the reduction of a cycle time for the formation of tires.

Owing to the aforesaid structure of the present invention, the operator has only to supply beads at the side of the headstock to the bead-temporary installing device during a suitable free time on the part of the operator when the band transfer means remains in a waiting position, with the result that most operational restrictions can be removed, and as compared with conventional apparatus, a cycle time for tire formation can be reduced by the time required for the usual bead supply, thereby enhancing the facility of tire production.

The invention will explained in detail with reference to a preferred embodiment shown in the accompanying drawings, wherein:

FIG. 1 is a front view showing a preferred embodiment of the present invention;

FIG. 2 is a view taken on the arrow line III—III of FIG. 1;

FIG. 3 is another view taken on the arrow line V—V of FIG. 1;

FIG. 4 is a cross-sectional view taken along the arrow line VI—VI of FIG. 2;

FIG. 5 is a cross-sectional view taken along the arrow line VII—VII of FIG. 3; and FIG. 6 is a cross-sectional view taken along the arrow line VIII—VIII of FIG. 3.

In FIG. 1, A indicates a conventional carcass-forming drum, B a headstock in support of the carcass-forming drum A in rotation and housing driving means for rotating the carcass-forming drum and expanding and contracting means thereof, C a well-known tailstock in support of a bead setter E opposite to the headstock B and attached to a common base K in such a manner that it becomes concentric with the axial line X—X of the apparatus at least at the instant of bead setting and retracts at the time of band insertion. D is a known bead setter at the side of the headstock and is fitted with a bead-setting ring hereinafter referred to, said bead setter being so constituted as to move in the direction of the axial line X—X by means of a fluid-pressure cylinder or the like with resort to the shaft of the drum A or other guide means as a guidance separately provided, E is a bead setter to the side of the tailstock and so constituted as to move in the direction of the axial line X—X when the tailstock C is in a forwardly advancing position (when the center of the bead setter coincides with the line X—X). F is a known band-forming drum arranged on the same axial line X—X as the drum A, G a known stand in support of the drum F in rotation and housing driving means for rotating the drum F and expanding and contracting means thereof. H is a known band transfer means arranged on the axial line X—X and so attached to a common base K as to move in the direction of the line X—X. And J is a bead temporary set device at the headstock as attached to the band transfer means H to the side of the drum A.

Meanwhile, the present apparatus should include stitcher means, ply-down means and turn-up means but the illustration of these members is omitted in the drawings.

The aforesaid bead temporary set device J at the side of the headstock consists of the following structure.

One end of each of a plurality of guide bars 3 is secured to a bracket 1a provided at a ring-shape frame 1 and the other end thereof is connected to the band transfer means H by conventional means, so that the distance between the center line II—II of the band transfer H and the frame 1 can be adjusted.

A movable ring-shape frame 2 is so attached to the guide bar 3 as to slide in the direction of the line X—X and adapted to slide for the required distance as guided by the guide bar 3 by driving means, for example, a fluid-pressure cylinder (not shown in the drawing).

The frame 1 is provided with U-shape members 11 in a fixed manner which are adapted to swing through a plurality of fluid-pressure cylinders 9 and pins 10.

On the other hand, the movable frame 2 is provided with a U-shape member 11' in a fixed manner which is adapted to swing through a link 5 and a pin 4 and a bracket 6 attached to the link 5 and is connected to fluid-pressure cylinder 9 in a swingable manner through a pin 8.

An arc member 12 of L-section shape is fixedly attached to a bracket 7 provided at one end of the link 5 and a plate spring 13 is also fixed to the inner side of the arc member 12. As shown in FIG. 2, a plurality of arc members 12 constitute a bead temporary setting ring.

When the frame 1 and the movable frame 2 comes nearest and the rod of the fluid-pressure cylinder 9 retracts to its stroke end, a bead-mount surface 12a of the arc member 12 will remain in the same plane at right angles to the line X—X. At the same time, the inner surface 12b of the arc member 12 is so designed in every part as to assume a cylindrical surface around the line X—X as the center, slightly larger than the internal diameter of a bead 20. Consequently, when the bead 20 is inserted onto the external surface 13a projecting from said bead mount surface 12a, said temporarily mounted bead 20 can be held not to fall by resilient counteraction of the plate spring 13.

In the case of the bead temporarily mount (as shown in FIG. 4), the distance between the centers of the pins 8 and 10 is made sufficiently smaller than that between the centers of the pins 4 and 8 and the shape formed by connecting all the pins should assume a right-angled triangle or isosceles which is considered most desirable in relationship with an effect which will be explained later on.

The bead setter D at the headstock consists of the following structure.

In FIG. 1, a ring-shape frame 18 is arranged in a manner concentric with the line X—X. A rod 19 secured to the ring-shape frame 18 is reciprocated by guide means and driving means (e.g., fluid-pressure cylinder) housed in the headstock B, so as to slide the ring-shape frame 18 in the direction of the line X—X.

A bead ring 14 concentrically secured to the frame 18 is provided with ring-shape projections 15 having the diameter 15a of its external surface 15 either equal to, or slightly smaller than, the diameter of the bead 20. As shown in FIGS. 3, 5 and 6, the bead ring 15 has recesses 16 formed therein. Preferably, as shown in FIG. 3, there are 12 such recesses.

These recesses have plate springs 17 alternately and fixedly attached thereto such that the diameter of their pitch for holding the bead is made slightly larger than the internal diameter of the bead and the recesses 16 without attachment of the plate springs 17 are so arranged as to face said plate springs 13.

In the aforesaid structure, the band transfer means H is in a waiting position (as shown in FIG. 1), and then the operator, when free of working, will put the bead 20 at the side of the headstock to the bead preliminary set device J.

On the other hand, the operator will put the bead at the tailstock E thereto at a suitable time in the same manner as is usual with conventional operation.

After the tailstock C retracts, the drum A is folded and green tire thus formed is withdrawn, it is customary to hold a band in cylindrical form prepared by stitching an inner liner and a carcass ply by conventional means previously on the drum F, and the band transfer means H upon the bead 20 at the headstock-side being attached to the bead temporary mount device J is caused to move from its waiting position until its central surface II—II coincides with the central surface IV—IV of the drum A. At this moment, the drum A still remains in folded condition.

After the movement of the band transfer means H has been completed, the drum A is destined to expand and subsequently, by releasing band holding by the band transfer H, the band can be transferred onto the drum from the band transfer means H.

At this instant, with respect to the bead preliminary mount device J, the position of the frame 1 is previously adjusted so that, at the time of termination of transfer of the band transfer means H, the bead 20 can be pinched between the arc member 12 for the bead preliminary mounting device and the bead ring 14. Under such conditions, when the cylinder 9 is firstly actuated in a direction so that its rod comes out, the diameter of the arc-member 12 can be contracted and simultaneously the attachment surface 12a works so as to slightly expand the distance between the same and the bead ring 14. Therefore, the bead 20 and the attachment surface 12a even if in adhesive contact will be separated from each other and the bead 20 can be left in the bead ring 14.

Next, when actuating driving means not shown in the drawing so as to transfer the movable frame 2 in a direction to be separated away from the frame 1 and to expand the distance between the centers of the pin 4 and the pin 10, the arc-member will be further separated from the bead ring 14 until it is moved sufficiently outside of the external diameter of the drum A in a direction separated from the line X—X. In this case, if the distance between the centers of the pins 8 and 10 is sufficiently made small, as compared with that between the centers of the pins 4 and 8 and if the centers of the pins 4, 8 and 10 are so determined in size as to form a regular triangle or isosceles, it is certain that the first half of direction of actuation of the arc-member 12 is in the direction of the line X—X and the latter half is in a direction to be separated from the line X—X. For example, the external circumference of the bead of the radial tire is largely inclined outwardly as compared with the bead 20 shown in FIGS. 4, 5 and 6. Accordingly, if the arc member 12 is expansively opened immediately after its movement, it will strike the external circumference of the bead 20. As described hereinbefore, by selecting the position of the pins 4, 8 and 10, it becomes possible to open the arc member 12 without causing it to come in contact with the bead 20 after its movement for the shortest distance.

After all the aforesaid steps have been completed, the band transfer means H is moved to its waiting position and thereafter, green tires can be formed one by one in a conventional manner.

As is apparent from the aforesaid explanation, in cases where green tire is removed and then the drum A remains in folded condition, the operator has the need for putting a bead at the headstock during a limited period before the insertion of the band, as conventional drawbacks and it is impossible to insert the band before the application of the bead is finished, thus giving rise to such further inconvenience as the prolongation of tire-forming cycle for the above-mentioned excessive period of time.

By contrast, according to the present invention with said preferred embodiment, the operator has only to apply a bead portion to a bead temporary mount device during his free time while the band transfer remains in its waiting position, so that the operation becomes free from all the aforesaid restrictions and moreover, it is possible to carry out band insertion and transfer to a bead set ring at a time in a mechanical manner, thereby permitting the reduction of a tire-forming cycle time by the erstwhile required period of time for the application of a bead as is often the case with conventional apparatus and improving the facility of production of tires.

What is claimed is:

1. In a tire-forming machine on a common base and having a headstock (B), a first tailstock (G) and a second tailstock (C) between said headstock (B) and said first tailstock (G) and having an apparatus for assembling an inner liner, carcass ply and other plys in cylindrical form to produce a tire band on a band forming drum (F) mounted on said first tailstock (G), transferring said band by a band transfer means (H) to a carcass-forming drum (A) mounted on said headstock (B) and aligned with the same shaft as said band transfer means (H) to form the tire carcass while said carcass is on said carcass-forming drum (A), incorporating a plurality of beads into said carcass and applying a tread portion on said carcass, the machine including a first bead setter means (D) mounted on said headstock (B) to transfer a bead onto said carcass while the carcass is on the carcass-forming drum (A) by moving axially from its initial position, towards the carcass forming drum (A), a second bead setter means (E) mounted on said second tailstock (C) to transfer a bead manually placed thereon onto said carcass while the carcass is on the carcass-forming drum by moving axially from its initial position, towards the carcass-forming drum (A), the improvement which comprises a bead-temporary supporting means (J) in its initial position between the band transfer means (H) and the second tailstock (C) to support a bead in circular form and with the axis of the bead coaxial with the axis of the carcass-forming drum, said bead-temporary supporting means (J) having mechanical transfer means to receive a bead placed manually thereon and to mechanically transfer said bead, in its circular form, to said first bead setter means (D) when said band transfer means transfers said band to said carcass-forming drum (A).

* * * * *